Oct. 21, 1969    M. LEGRAIN    3,473,516
AUTOMATIC APPARATUS FOR PREPARING AND
DISPENSING FLUID FOOD
Filed June 23, 1967    6 Sheets-Sheet 3

INVENTOR.
Michel Legrain
BY Sparrow and Sparrow
ATTORNEYS

United States Patent Office 3,473,516
Patented Oct. 21, 1969

3,473,516
AUTOMATIC APPARATUS FOR PREPARING
AND DISPENSING FLUID FOOD
Michel Legrain, Foulbec par Conteville, Eure, France
Filed June 23, 1967, Ser. No. 648,305
Claims priority, application France, June 23, 1966,
7,146; Sept. 16, 1966, 76,683; Mar. 3, 1967,
7,175; June 19, 1967, Ser. No. 7,182
Int. Cl. A01k 9/00
U.S. Cl. 119—71  7 Claims

ABSTRACT OF THE DISCLOSURE

An improved apparatus intended for automatic production of fluid food, for instance a liquid food to be used for the nourishment either of men or animals, the said food being prepared by the mixing and dissolving of pulverulent or similar products to a liquid such as water.

BACKGROUND OF THE INVENTION

Apparatuses of the said kind, already known, comprise, as essential parts, a reserve for pulverulent product and a mixer receiving such product as well as the liquid to be used for dissolving; with such parts cooperate devices for admitting the product and the liquid to the mixer and leading the food thus prepared to the point or points of drawing.

One of the chief drawbacks to be met with, in the use of such apparatuses which have to work automatically without any tending or special attention, resides in a possible lack of regular supplying of the mixer with the pulverulent product.

One of the purposes of the said invention is to provide means to overcome said drawbacks. Other purposes will appear hereinafter.

SUMMARY

According to one of the chief features of the invention, the pulverulent product is led into the mixer of the apparatus by means of an Archimedes' screw, followed by a feeding device, the flow of which is greater than that of the said screw.

The invention further consists in a special arrangement of the apparatus according to which the hopper, containing the reserve of pulverulent product, is placed, wholly or partly, under the mixer so as to obtain a more compact apparatus.

The invention is likewise characterised by the assembling, in a unit easily removable and replaceable, placed on the upper part of the apparatus, of the motors of the mixer and of the supplying with pulverulent product and of the control devices of the said motors, such control devices comprising a beam scale to which the mixing container is hung through the medium of the shaft of the stirrer of the mixer.

The invention likewise consists in having the nipples of the apparatus held by a hot-water-bottle.

The invention is further characterized by the sterilization, through ultra-violet radiation, of the liquid food between the mixer and the drawing points of the apparatus.

According to another arrangement of the apparatus, the mixer and the control devices constitute an autonomous unit, mounted on a protection and support device equally autonomous, the same holds the distributing parts, for instance the nipples, the said device comprising vertically adjustable legs and open-work protecting bands the space of which permits the approach of young animals and hinders that of adults.

The invention further consists in providing the apparatus with the means of admitting into a mixer, provided with a stirrer, the pulverulent product to be dissolved within a flow of liquid brought to a temperature sufficient to obtain a primary mixture of such pulverulent product, and to provide another supplying of such mixer with a supply of liquid the temperature of which is such that the fluid food, resulting from the mixture of the said primary mixing and of the said supplying with liquid may be delivered for drawing.

The invention further consists in an arrangement of parts, comprising a rotating elastic scraper with two helices having reverse pitches, placed in the reserve of pulverulent product of the apparatus, coupled with an Archimedes' screw and serving to supply the mixer of the apparatus with pulverulent product.

The invention likewise consists in providing the Archimedes' screw, at its end on the side of the inlet of the pulverulent product at the screw, with a blade made of flexible elastic material extending the helicoidal surface of the screw.

BRIEF DESCRIPTION OF THE DRAWING

In order that the invention may be more clearly understood, reference will now be made to the accompanying drawings which show some embodiments thereof by way of example and in which.

DESCRIPTION OF THE PREFERRED EMBODIMENTS

Figure 1:
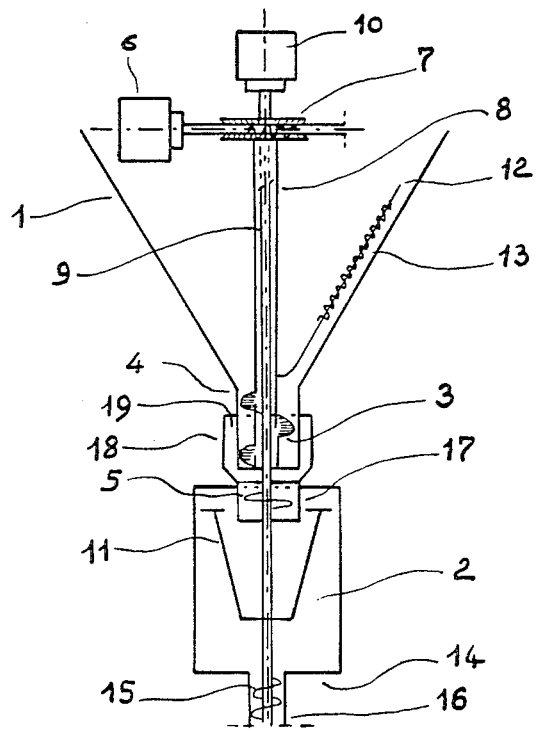
FIGURE 1 is a partial vertical section of an apparatus according to the invention and intended for the automatic preparation of fluid food.
Figure 2:
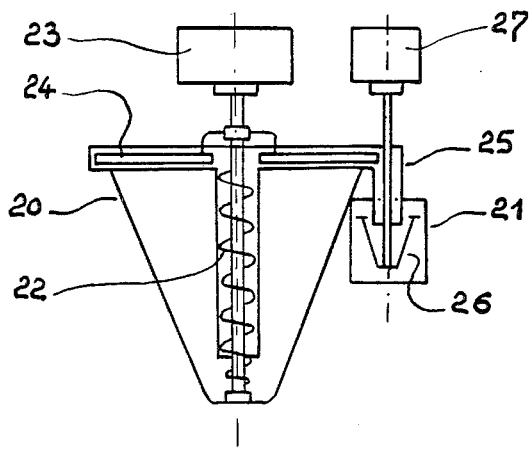
FIGURE 2 is a partial vertical section of a variant of the said apparatus.
Figure 3:
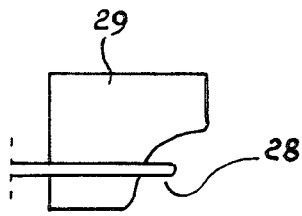
FIGURE 3 shows a vertical section of a hot-water bottle provided with nipples and equipping the apparatus.
Figures 4, 5:
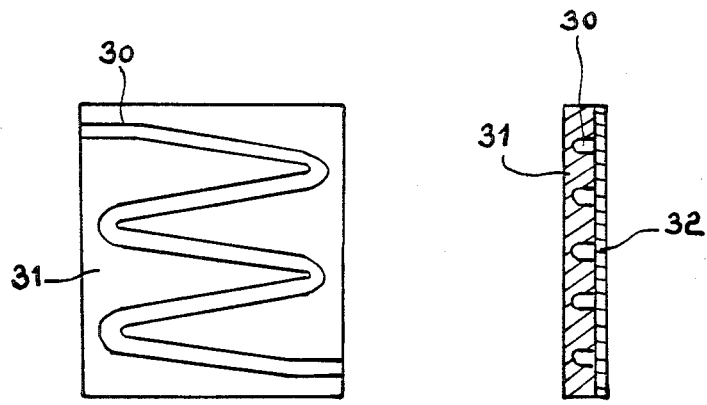
FIGURES 4 and 5 respectively represent in front and in section a germicide device to be used in the apparatus.
Figure 6:
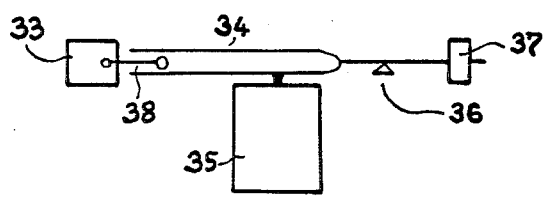
FIGURE 6 shows an elevation of a weighing device of the mixer, actuating an electric contact controlling the working of the apparatus.

According to the invention and more particularly according to the methods for the application thereof as well as its various embodiments, the following are exemplifications thereof following or similar to the same.

The apparatus is constituted by a hopper 1, containing the pulverulent product reserve, and by a mixer 2 receiving such product and the liquid for dissolving the same.

According to the invention, the pulerulent product, contained the hopper 1, is led to the mixer 2 through an Archimedes' screw 3 placed in the spout 4 and followed by a feeding device, the flow of which is greater than that of this screw 3. In the proposed example, such device consists of another Archimedes' screw 5 with a rotation speed higher than that of the screw 3.

The screw 3 is actuated by the motor 6 through a gearing 7 and a tubular shaft 8. Inside this shaft 8 is placed the shaft 9 driven by the motor 10. The shaft 9 drives the screw 5 and the stirrer 11 of the mixer 2. To the tubular shaft 8 is fixed an elastic scraper 12 provided with a helicoidal coil 13, free to rotate round the scraper.

Eventually, the shaft 9 may be extended under the bottom 14 of the mixer 2 and provided with another Archimedes' screw 15, the pitch of which is such that, when the said screw is rotating, the same prevents the liquid in the mixer 2 from flowing out through the pipe 16. When the motor 10 stops, the screw 15 no longer opposes the flowing of the liquid containing in the mixer 2 and the same is automatically emptied through the pipe 16. Thus is obtained the equivalent of a drain valve, having over the usual valves the advantage not to retain the soils and to be thus perfectly hygienic.

The screw 5 rotates in a spout 17 which widens at 18 surrounding spout 4. The annular space 19 between the two spouts, insures the air passage necessary to the efficient working of the system.

In the aforesaid example, the hopper, containing the pulverulent product reserve, is placed above the mixer. As a variant, in order to obtain a more compact apparatus, the hopper 20 may be placed, wholly or partly, under the mixer 21. In this case an Archimedes' screw 22, actuated by the motor 23, raises the product in the hopper on the level of a distributor with curved blades 24, likewise driven by the motor 23. The curvature of the blades leads the pulverulent product towards the spout 25 from which it falls into the mixer 21. The stirrer 26 of this mixer is driven by the motor 27. Of course, according to the invention, the flow of the distributor with blades 24 is greater than that of the screw 22.

Particularly, when the apparatus is used for feeding small animals, it may be useful to create a warm environment in the vicinity of the points of drawing of the food elaborated by the mixer, i.e. in the vicinity of the nipples. For this purpose, the nipples 28 are held by a hot-water bottle 29, the shape of which protects at least one part of the animal which is being fed. The hot-water bottle 29 will be advantageously heated by the liquid intended for the mixer, but any other means of heating can also be used.

In order to sterilize the liquid food in the mixer, the said food is submitted, between the mixer and the drawing points, to an ultra-violet radiation. For this purpose, the liquid food passes in zig-zag groove 30, formed in a plate 31 hermetically covered with another plate 32. The material of the plate 31 and/or 32 is selected so as to permit transmission of the ultar-violet radiation freely therethrough to which the case, formed by the plates 31, 32, is exposed by removing the plate 22, it is easy to clean the grove 30 thoroughly.

The working of the apparatus, particularly the starting and the stopping of the motors of the stirrer and of the Archimedes' screw, is advantageously controlled by an electric contact 33, actuated by the beam 34 of a scale bearing the mixer 35. The beam oscillates round the point 36; an adjustable counterweight 37 ensures the required balance. The contact 33 comprises a spring rocking device and its control lever 38 engages in a fork formed by the beam 34. The contact 33 may be shifted along the beam 34 in order to modify the characteristics of the apparatus.

Figure 7:
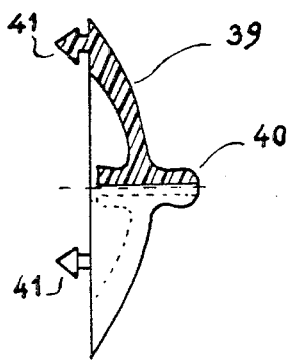
FIGURE 7 shows a partial section and elevation of a nipple adaptable to the apparatus.

When the apparatus is used for the breeding of animals such as piglets or rabbits, it is necessary to place, at the points of food drawing by such animals, mamillate nipples of the same kind as the one shown in 39 on the FIG. 7. The nipple has a cruciform opening 40. It is fixed by elastic apendices 41 engaged in holes existing in the part which bears the nipple.

Figure 8:
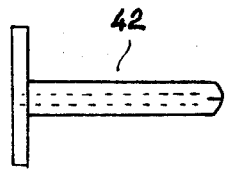
FIGURES 8 and 9 represent, respectively seen in elevation and in plane, a variant of a nipple.
Figure 9:
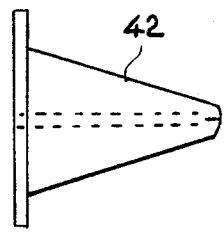
Figure 10:
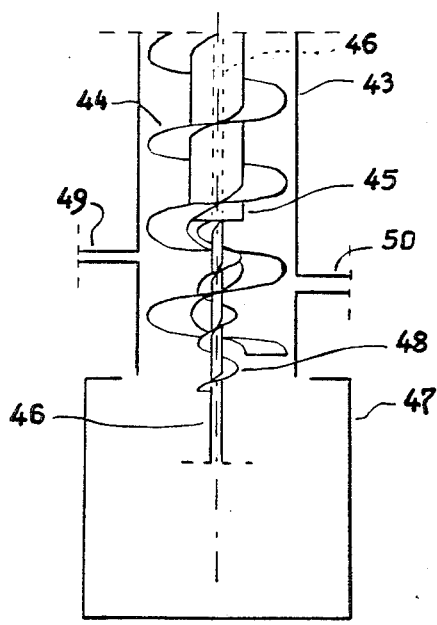
FIGURE 10 shows, in partial section and elevation, a device leading the powder and the liquid to the mixer of the apparatus.
Figure 11:
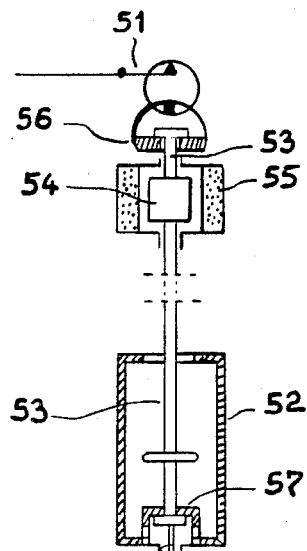
FIGURE 11 represents a mixer hung through the shaft of its stirrer and adaptable to the apparatus.

As a variant, the nipple 42 may have the shape of a flat trapezoidal prism as shown in FIGS. 8 and 9.

The apparatus may also comprise a device bringing the powder and the liquid to the mixer and comprising a conduit 43 supplied with powder by an Archimedes' screw 44, driven by a rotating tubular shaft 45. Inside the shaft 45 rotates the shaft 46 of the stirrer of the mixer 47. The said shaft 46, which rotates faster than the shaft 45, has an Archimedes' screw 48, placed inside the face terminal spires of the screw 44. The liquid is admitted through pipes such as 49 and 50. For example, the pipe 49 may serve to admit an oily product, while the pipe 50 brings the water necessary to the making of the mixture in the mixer 47. Another direct inlet of water may be provided for the mixer.

According to an arrangement particularly convenient as regards the assembling, dismounting and the replacing of the motors and mechanisms of the apparatus, the motors of the mixer and the suplying with the pulverulent produce and the control devices of such motors are grouped so as to form a unit easily dismountable and replaceable, placed at the upper part of the apparatus. For that purpose the beam scale 51, similar to the above mentioned beam scale 34 and having the same use, bears the container 52 through the shaft 53 of the stirrer. For this purpose, the shaft 53, actuated by the rotor 54 of the electric motor 55, rotates in thrust bearings 56, 57, the bearing 56 being linked on the beam 51 and the bearing 57 being integral with the bottom of the container 52.

The motor 55 is an asynchronous motor, the rotor 54 of which is made so as to create no electromagnetic forces according to the axis of the shaft 53.

The motor, actuating the power supply, for instance the motor 6, may be an electric motor fed with current during short periods, separated by adjustable intervals, permitting to vary the flow of powder.

Advantageously, the liquid, used for the mixture, may be heated by two devices with thermostats maintained at different temperatures, 20° C. and 60° C. for instance. The liquid from each device is mixed prior to being introduced into the mixer or separately introduced into different places; for instance, the hottest liquid is introduced into 50 and the other liquid is directly admitted into the container of the mixer. The adjusting of the final temperature of the mixture is ensured by two valves, the first one on the hottest liquid, the second one on the other liquid. A single control, opening one valve and closing the other, regulates the flows so as to obtain the required temperature. To such valves are joined electro-valves opening and closing the passage of the liquid; the said electro-valves are controlled by the contact actuated by the beam bearing the container of the mixer.

Figure 12:
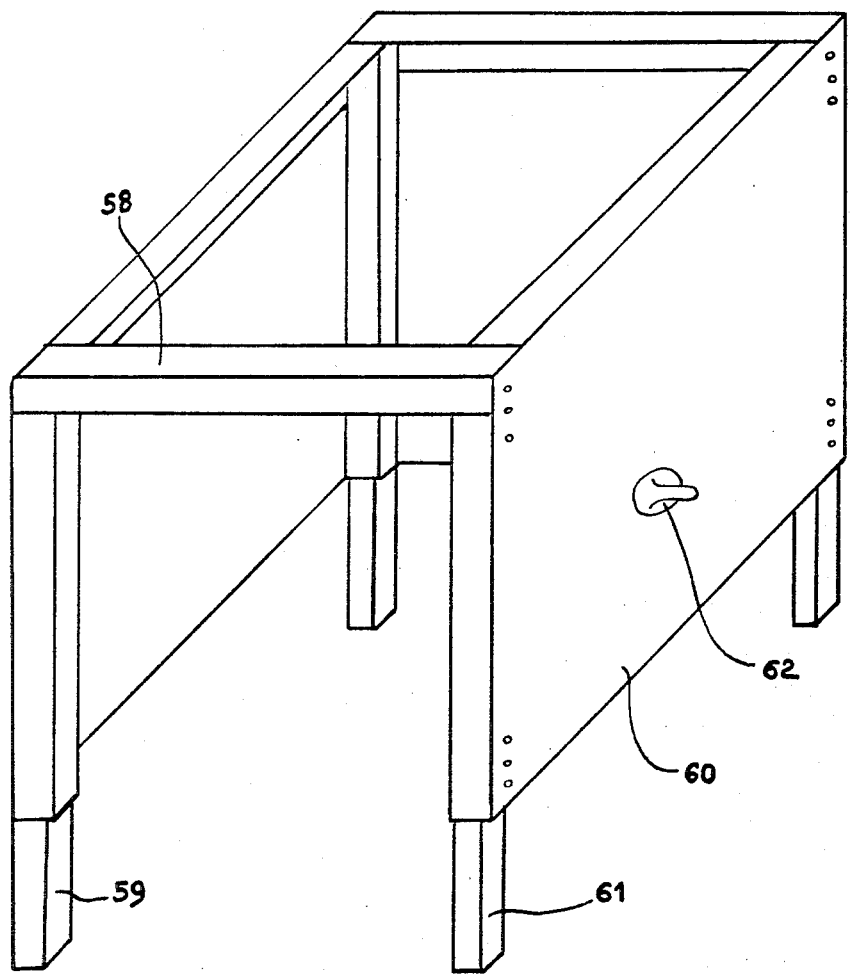
FIGURE 12 is a perspective view of a supporting device for the nipples, intended to surround and to protect the food preparing unit of the apparatus.
Figure 13:
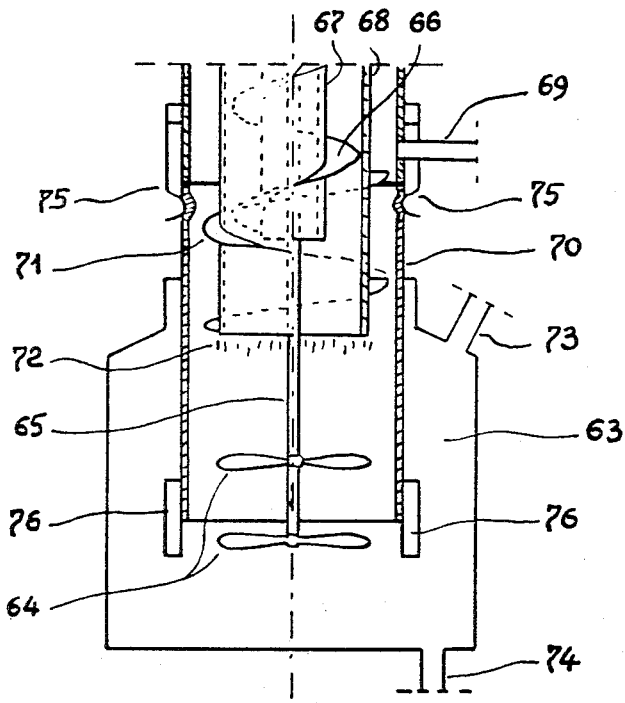
FIGURE 13 represents, in partial vertical section and elevation, the mixer of a variant of the apparatus, according to the invention.
Figure 14:
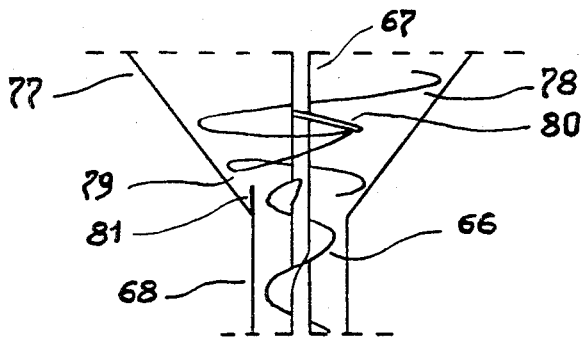
FIGURE 14 is a perspective view of the scraper of the pulverulent product reserve of said variant.
Figure 15:
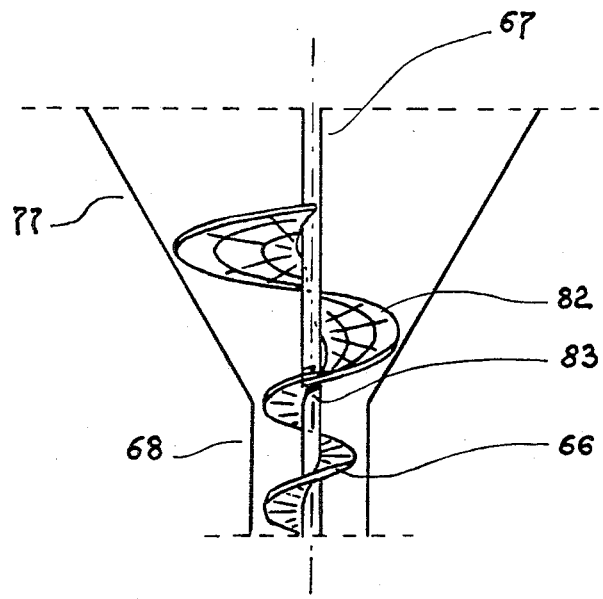
FIGURE 15 represents, in partial section and elevation, the lower part of the hopper, containing the pulverulent product, and the upper part of the Archimedes' screw of another variant of the apparatus according to the invention.

The device of support shown on the FIG. 12, consisting of angle-irons and struts, such as 58 and 59 respectively, whereon sheet iron plates, such as 60, are maintained by screws, surrounds the mixer and the control devices, the protection of which is ensured by the said device. It comprises four legs, such as 61, vertically adjustable, and bears the nipples, such as 62, where the young animals come to feed. The said nipples are obviously connected, in a manner which is not shown on the drawing, with the outlets of the mixer. Thus, the outlets are independent and do not have to rely on the strength of the nipples which are accessible to the cattle. The said parts are here constituted either directly by the sides of the support or even by open-work bands which may be fixed to the support. Then, the young animals can seize a nipple in the intervals between two bands, but the size of this interval is such that it hinders adults from approaching. The support may further be provided with a protecting roof.

As a variant, the apparatus is provided with means permitting to admit into the mixer 63, inside which is the rotating stirrer 64, actuated by the shaft 65, the pulverulent product, such as milk powder from a reserve, inside a flow of liquid brought to a temperature sufficient to obtain a primary mixture of this product. To that effect, the said means comprise an Archimedes' screw 66, actuated by the tubular shaft 67 and bringing the pulverulent product inside the spout 68, and an inlet of hot liquid, for instance hot water, in 69 in a tubular conduit 70 outside the spout 68 and coaxial to it. The hot liquid, introduced into 69, flows down along an helix 71, between the outer side of the spout 68 and the inner side of the conduit 70, and forms in 72, at the lower limit of the spout 68, a flowing inside which the pulverulent product, brought by the screw 66, is admitted.

Another supplying of the mixer 63 with liquid is provided in 73. The flows and temperatures of the liquids, introduced into 69 and 73, are such that the fluid food, elaborated in the mixer and evacuated through the pipe 74, may be delivered for use. For instance, cold water is admitted in 73 to bring to a temperature suitable to animals the milk contained in the mixer and resulting from the primary mixture of the milk powder, introduced through the spout 68, and the hot water admitted in 69.

To prevent any awkward consequences resulting from an accidental obturation of the conduit 70 by the pulverulent product, the said conduit is fixed to the apparatus by spring fastenings. If the conduit 70 happens to be obstructed owing to an accumulation of powder, the action of the Archimedes' screw 66 upon the powder obstructing the conduit releases the said conduit from its fastenings; the conduit 70 drops at the bottom of the mixer and renders it heavier, which causes a stopping of the apparatus, the mixer being, as is known, placed on a weighing device controlling the running of the motors driving the stirrer 64 and the screw 66 and the valves of the inlets 69 and 73.

The conduit 70 bears in 76 fixed paddles facing the stirrer 64.

According to another characteristic of the invention, the hopper 77, containing the pulverulent product reserve of the apparatus, is provided with a rotating scraper constituted by two conical helices 78, 79 made of elastic thread. These helices have reverse pitches and each of them has one free end and one end fixed to an arm 80 integral with the shaft 67 bearing the Archimedes' screw 66.

When the shaft 67 rotates, the helix 78 tends to cause the pulverulent product to rise again in the hopper 77 while the helix 79 tends to cause the said product to flow down. Of course, the Archimedes' screw 66 causes the pulverulent product to flow down the spout 68. The elasticity and the winding of the threads of the helices 78 and 79 are such that, when free, the said helices tends to be applied to the inner surface of the hopper 77. In 81 is placed a fixed lug.

According to another variant, the screw 66, may be provided, at its end on the side of the inlet of the pulverulent product, i.e. at the lower part of the hopper 77, with a blade 82 made of flexible elastic material extending the helicoidal surface of the screw 66.

The blade 82 may be made of plastic material or thin metal. It is fixed on the screw 66 by any appropriate means, by a bolt 83 for instance. In the present example, the blade 82 forms a conical helicoid, the cone of which follows the shape of the inner surface of the hopper 77.

It is obvious that the invention is not limited to the methods of application and to the embodiments herein described but extends to all modifications thereof.

What I claim is:

1. Automatic apparatus for preparing a fluid food, particularly a liquid food for the nourishment either of men or animals, and comprising a reserve for pulverulent product, an Archimedes' screw rotating inside a spout and leading the said product to a mixer, in which the product is completely mixed with a liquid in order to obtain the food, and a pipe leading the food prepared in the mixer to one drawing point, at least, said apparatus comprising means to bring at least a part of the liquid into the pulverulent product presenting itself at the outlet of the spout towards the mixer, said Archimedes' screw being followed by a fluid moving device, the pulverulent product flow of which is greater than that of the said screw.

2. Apparatus, according to claim 1, wherein the hopper containing the pulverulent product reserve, is placed, partly at least, under the mixer.

3. Apparatus, according to claim 1, characterized by control devices, said control devices comprising a beam scale to which the mixing container is hung by means of the shaft of the stirrer of the mixer.

4. Apparatus, according to claim 1, wherein one drawing point, at least, is provided with a nipple held by a hot-water bottle.

5. Apparatus, according to claim 1, wherein the liquid food in the mixer, is submitted, between the mixer and one drawing point, at least, to an ultra-violet radiation.

6. Apparatus, according to claim 1, wherein the mixer and the control devices constitute an autonomous unit, mounted on a protection and support device equally autonomous, the same holds the distributing parts, the said device comprising vertically adjustable legs and openwork protecting bands, the space of which permits the approach of young animals and hinders that of adults.

7. Apparatus, according to claim 1, wherein the Archimedes' screw, at its end on the side of the inlet of the pulverulent product at the screw, is provided with a blade made of flexible elastic material extending the helicoidal surface of the screw.

References Cited

UNITED STATES PATENTS

| | | | |
|---|---|---|---|
| 3,256,861 | 6/1966 | Giltner | 119—51.11 |
| 3,307,521 | 3/1967 | Tavera et al. | 119—71 |
| 3,313,272 | 4/1967 | Moloney | 119—51.11 |
| 3,314,398 | 4/1967 | Legourd | 119—71 |
| 3,331,357 | 7/1967 | Legrain et al. | 119—71 |

ALDRICH F. MEDBERY, Primary Examiner